United States Patent Office 3,075,007
Patented Jan. 22, 1963

3,075,007
NITRIC ACID OXIDATION OF 1,1-DIARYLALKANES TO PRODUCE CARBOXY SUBSTITUTED DIARYL KETONES
John H. McCracken, Monroeville, and Johann G. D. Schulz, Pittsburgh, Pa., assignors to Gulf Research & Development Company, Pittsburgh, Pa., a corporation of Delaware
No Drawing. Filed June 24, 1959, Ser. No. 822,415
4 Claims. (Cl. 260—517)

This invention relates to a process for preparing diarylketones, preferably diarylketone polycarboxylic acids.

Diarylketones are obtained in accordance with our process by subjecting to oxidation with nitric acid a 1,1-diarylalkane represented in general by the following structural formula:

wherein R and $R_1$, the same or different, are aryl radicals containing one or more rings, at least one of which is an aromatic ring, such as phenyl, biphenyl, naphthyl, phenanthryl, anthryl, indyl, dihydronaphthyl, cyclohexylphenyl, etc., said aryl radicals preferably carrying as nuclear substituents 0 to five radicals defined by $R_2$; and $R_2$ is selected from the group consisting of primary, secondary and tertiary alkyls having from one to 16 carbon atoms, preferably from one to 8 carbon atoms, such as methyl, ethyl, n-propyl, isopropyl, isobutyl, amyl, isoamyl, hexyl, isooctyl, decyl, tetradecyl, hexadecyl, etc., as well as groups such as F, Cl, Br., I, $NO_2$, $SO_3H$, COOH, COOR (where R is an alkyl group), $NH_2$, OH, etc. Specific examples of compounds which can be oxidized in accordance with our process to obtain the diaryl ketones are:

1,1-diphenylethane
1,1-di(para)tolylethane
1,1-bis(2-ethylphenyl)ethane
1-(4-propylphenyl),1-(4-methylphenyl)propane
1-(2,4-dimethylphenyl),1-(4-propylphenyl)pentane
1,1-bis(2-methylanthryl)butane
1-(2-methyl,4-chlorophenyl),1-(2-ethylphenyl)octane
1,1-bis(tetramethylphenyl)decane
1-(2-methyl,4-isopropylphenyl),1 - (4 - methyl - 2 - nitrophenyl)ethane
1,1-bis(2,4-diisopropylphenyl)hexadecane
1,1-bis(2-ethyl,4-butylphenyl)isobutane
1,1-bis(2-hexylphenanthryl),3,3-dimethylpentane
1-(2-propyl,3-carboxynaphthyl),1 - (4 - butylphenyl)hexane
1-(5-octyl,1,4-dihydronaphthyl),1 - (2 - methylnaphthyl)-dodecane
1-(bromo - 9,10 - dihydrophenanthryl),1-(2-ethylphenyl)-decane
1-(2-propyl,3-aminophenyl),1-(4 - methyl-2-sulfophenyl)-ethane, etc.

The preferred diarylalkane which can be oxidized in accordance with our invention is 1,1-di(para)tolylethane.

Specific examples of diarylketones which can be prepared in accordance with our invention are:

Benzophenone
Benzophenone 4-carboxylic acid
Benzophenone 4,4'-dicarboxylic acid
Benzophenone 2,4,6-tricarboxylic acid
Benzophenone 2,4,2',4'-tetracarboxylic acid
Benzophenone decacarboxylic acid
2-chlorobenzophenone 4'-carboxylic acid
3,3'-dinitrobenzophenone
4-sulfobenzophenone
Dinaphthylketone
Phenyl-naphthylketone
Tolyl-anthrylketone
2-methyl,4'-carboxybenzophenone
2-chloro, 4-methylbenzophenone 4'-carboxylic acid, etc.

Converting a 1,1-diarylalkane to the corresponding diarylketone or a diarylketone carboxylic acid similar to benzophenone 4,4'-dicarboxylic acid is an extremely difficult procedure. In the event a 1,1-diarylalkane such as 1,1-di(para)tolylethane is oxidized with air at an elevated temperature and pressure, for example, 90° C. and 45 pounds per square inch gauge over any length of time, even in the presence of a catalyst such as manganese naphthenate, the reaction will proceed and substantially terminate with a conversion of about 10 percent to 1,1-di(para)tolylethane hydroperoxide. This is unexpected in view of the fact that diarylmethanes such as para ditolylmethane can be oxidized with air under similar reaction conditions to obtain benzophenone 4,4'-dicarboxylic acid. It would not be expected that nitric acid could be employed in such reaction to obtain diarylketones, since oxidation of diarylalkanes, such as ditolylalkanes, in which the aryl groups, such as tolyl groups, are joined together through one or more non-terminal carbon atoms of the alkane, results not in diarylketones but in the corresponding carboxylic acids. We have found, for example, that when 1,1-di(para)tolylethane is oxidized with nitric acid having a concentration of 20 percent at a low temperature, such as a temperature of 50° C., for about 2 hours, the reaction resulted not in the production of a ketone but in the nitration of the diarylalkane.

We have found that diarylketones, particularly diarylketone polycarboxylic acids, can be prepared with no appreciable nitration from diarylalkanes, particularly a 1,1-diarylalkane, by reacting the latter with nitric acid while controlling the molar ratio of nitric acid to diarylalkane, the reaction temperature and the contact time.

The initial strength of nitric acid employed can be from about 5 to about 70 percent, preferably from about 20 to about 40 percent. The amount of nitric acid employed, determined as the molar ratio of 100 percent nitric acid relative to the diarylalkane, is critical, however, and must be about 8.0 to about 17.0, preferably about 8.0 to about 12.0. Too high a molar ratio of nitric acid, calculated as 100 percent nitric acid relative to the diarylalkane, will result in an excessively high conversion of diarylalkane to degradation products. Too low a molar ratio will result in nitration.

The amount of time the reactants are held within the temperature range hereinafter specified is also important. Such time must be about one minute to about 48 hours, preferably about 10 minutes to about 2 hours. Too low a residence time results in decreased yields, while too long a residence period is not commercially attractive. Improved results are further obtained by slowly heating the reactants to reaction temperature. We have found, for example, that the reactants can advantageously be heated to reaction temperature at a rate of about 0.5° to about 1.5° C. per minute.

In order to obtain the diarylketones in accordance with our invention it is absolutely necessary to maintain the reactants at a temperature of about 110° to about 350° C., preferably about 150° to about 250° C. for the defined residence time. When the temperature is maintained below about 110° C., nitration occurs and nitro products are obtained instead of the desired diarylketone. Temperatures in excess of about 350° C. result in the production of excessive amounts of degradation and decomposition products.

Sufficient pressure should be maintained on the reaction system to keep the nitric acid and water formed primarily in the liquid state at the desired reaction temperature. Higher pressures can be employed but are not necessary. Pressures can, therefore, be from about atmospheric to about 500 pounds per square inch gauge or higher.

The invention can further be illustrated by reference to the following examples.

*Example I*

In to a one-liter autoclave were placed 21 grams of 1,1-di(para)tolylethane and 289 grams of nitric acid having a concentration of 20 percent. The molar ratio of nitric acid, as 100 percent nitric acid, to 1,1-di(para)tolylethane was therefore 9.2:1. The mixture was heated to a temperature of 110° C. and maintained at this temperature for 30 minutes at atmospheric pressure. Carbon dioxide, nitrogen oxides and water formed were vented periodically to maintain the desired pressure. At the conclusion of the run, the reactor was cooled and vented to the atmosphere and the products were separated and analyzed. The conversion to benzophenone 4,4'-dicarboxylic acid was only 8 mole percent.

*Example II*

Again 21 grams of 1,1-di(para)tolylethane and 144.7 grams of nitric acid having a concentration of 40 percent were placed in a one-liter autoclave, the molar ratio of nitric acid, as 100 percent nitric acid, to 1,1-di(para)tolylethane being 9.2:1. The mixture was heated to a temperature of 163° C. and maintained at this temperature for 30 minutes and a pressure of 130 pounds per square inch gauge. The conversion of 1,1-di(para)tolylethane to benzophenone 4,4'-dicarboxylic acid was 63.5 mole percent, and only 3 mole percent of the product was lost to decomposition or degradation products. A comparison of the present run with that of Example I shows that operation at elevated temperatures within our range and pressures sufficient to maintain the nitric acid and water formed in the liquid phase results in greatly increased yields of desired product with small losses to other materials.

*Example III*

This run is similar to Example II except that while the strength of the nitric acid was 30 percent, the molar ratio of nitric acid, calculated as 100 percent nitric acid, to 1,1-di(para)tolylethane was still 9.2:1, the reaction temperature 177° C., the reaction time 45 minutes and the pressure 125 pounds per square inch gauge. The conversion of 1,1-di(para)tolylethane, to benzophenone 4,4'-dicarboxylic acid was 71 mole percent. The loss of charge to degradation and decomposition products was 14.5 mole percent, which is slightly high but not excessive.

*Example IV*

The run of Example III was repeated except that the reaction temperature was maintained at 200° C. and the pressure at 335 pounds per square inch gauge. The conversion of 1,1-di(para)tolylethane to benzophenone 4,4'-dicarboxylic acid was 91.5 mole percent. The loss of charge to undesirable products was 8.5 mole percent.

*Example V*

Into a two-gallon autoclave was placed 420 grams of 1,1-di(para)tolylethane and 3846 grams of nitric acid having a concentration of 30 percent. The molar ratio of nitric acid, as 100 percent nitric acid, to 1,1-di(para)tolylethane was therefore 9.2. The mixture was slowly heated at a rate of about one degree centigrade per minute to a temperature of 177° C. and maintained at a temperature within the range of about 177° to 193° C. for the next 40 minutes. The autogeneous reaction pressure was about 320 pounds per square inch gauge. The reactor was cooled and vented to the atmosphere and the products were separated and analyzed. The conversion to benzophenone 4,4'-dicarboxylic acid was 98 mole percent, with only a 2 percent loss to other products.

*Example VI*

In this run there was employed 21 grams of 1,1-di-(para)tolylethane and 231 grams of 40 percent nitric acid. The molar ratio of nitric acid, calculated as 100 percent nitric acid, to 1,1-di(para)tolylethane was therefore 14.7:1. The mixture was heated to a temperature of 177° C., the pressure was 150 pounds per square inch gauge and the reaction time at this temperature was 75 minutes. The conversion of 1,1-di(para)tolylethane to benzophenone 4,4'-dicarboxylic acid was 71 mole percent and loss of charge to undesirable product was 26 mole percent. It can be seen that increasing the molar ratio of nitric acid, as 100 percent nitric acid, to the charge results in larger losses to undesirable products, although the conversion to desirable product remains high.

In the following examples, it will be seen that when the molar ratio of nitric acid, calculated as 100 percent nitric acid, to diarylalkane is in excess of the amounts stated, extremely low conversion of diarylalkane to desired product is obtained and very large amounts of decomposition and degradation products are formed.

*Example VII*

Twenty-one grams of 1,1-di(para)tolylethane was admixed with 385 grams of nitric acid having a concentration of 30 percent. The molar ratio of nitric acid, calculated as 100 percent nitric acid, to 1,1-di(para)tolylethane was therefore 18.3:1. The mixture was heated to a temperature of 160° C. and maintained at this temperature for 78 minutes. The pressure was 140 pounds per square inch gauge. The conversion of 1,1-di(para)tolylethane to benzophenone 4,4'-dicarboxylic acid was only 34.8 mole percent and the loss of charge to undesirable product was 57.5 mole percent.

*Example VIII*

The run of Example VII was repeated except that the reaction temperature was maintained at 177° C., the pressure 130 pounds per square inch gauge and the reaction time one hour. The conversion of 1,1-di(para)tolylethane to benzophenone 4,4'-dicarboxylic acid was only 38.0 mole percent and the loss of charge to undesirable product was 57.0 mole percent.

Obviously, many modifications and variations of the invention as hereinabove set forth can be made without departing from the spirit and scope thereof and therefore only such limitations should be imposed as are indicated by the appended claims.

We claim:

1. A process for preparing diarylketone carboxylic acids which comprises subjecting to oxidation with nitric acid having an initial concentration of about 5 to about 70 percent, at a temperature of about 110° to about 350° C. for about one minute to about 48 hours a 1,1-diarylalkane represented in general by the following structural formula:

wherein R and $R_1$ are aryl groups carrying as nuclear substituents alkyl radicals having from one to eight carbon atoms and $R_2$ is an alkyl radical having from one to eight carbon atoms, the molar ratio of said nitric acid, calculated as 100 percent nitric acid, to said diarylalkane being about 8.0 to about 17.0.

2. A process for preparing diarylketone carboxylic acids which comprises subjecting to oxidation with nitric acid having an initial concentration of about 5 to about 70 percent, at a temperature of about 110° to about 350° C. for about one minute to about 48 hours a 1,1-diarylalkane represented in general by the following structural formula:

wherein R and $R_1$ are aryl groups carrying as nuclear substituents methyl radicals and $R_2$ is an alkyl radical having from one to eight carbon atoms, the molar ratio of said nitric acid, calculated as 100 percent nitric acid, to said diarylalkane being about 8.0 to about 17.0.

3. A process for preparing a diarylketone carboxylic acid which comprises subjecting to oxidation with nitric acid having an initial concentration of about 5 to about 70 percent, at a temperature of about 110° to about 350° C. for about one minute to about 48 hours, 1,1-di(para)tolylethane, the molar ratio of said nitric acid, calculated as 100 percent nitric acid, to said 1,1-di(para)tolylethane being about 8.0 to about 17.0 whereby benzophenone 4,4'-dicarboxylic acid is obtained.

4. A process for preparing a diarylketone carboxylic acid which comprises subjecting to oxidation with nitric acid having an initial concentration of about 5 to about 70 percent, at a temperature of about 110° to about 350° C. for about one minute to about 48 hours, 1,1-di(para)tolylethane, the molar ratio of said nitric acid, calculated as 100 percent nitric acid, to said 1,1-di(para)tolylethane being about 8.0 to about 12.0, whereby benzophenone 4,4'-dicarboxylic acid is obtained.

References Cited in the file of this patent
FOREIGN PATENTS
713,812    Great Britain _____ May 5, 1952
OTHER REFERENCES
Szmant: J. Org. Chem., vol. 21, page 80 (1956).